United States Patent
Sawada

(10) Patent No.: US 6,724,821 B1
(45) Date of Patent: Apr. 20, 2004

(54) PICTURE CODING APPARATUS WITH CODING EFFICIENCY IMPROVED

(75) Inventor: Hideki Sawada, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/567,071

(22) Filed: May 8, 2000

(30) Foreign Application Priority Data

May 13, 1999 (JP) .......................................... 11-132456

(51) Int. Cl.[7] .................................................. H04B 1/66
(52) U.S. Cl. ............................. 375/240.16; 375/240.23
(58) Field of Search ..................... 375/240.12–240.17, 375/240.23

(56) References Cited

U.S. PATENT DOCUMENTS

| | | | |
|---|---|---|---|
| 5,355,378 A | | 10/1994 | Ohta |
| 5,424,779 A | | 6/1995 | Odaka et al. |
| 5,428,396 A | * | 6/1995 | Yagasaki et al. ........ 375/240.16 |
| 6,215,823 B1 | * | 4/2001 | Kim et al. ............. 375/240.16 |
| 6,498,810 B1 | * | 12/2002 | Kim et al. ................... 375/240 |

FOREIGN PATENT DOCUMENTS

| | | | |
|---|---|---|---|
| GB | 2305797 | | 4/1997 |
| JP | 64-73986 | * | 3/1989 |
| JP | 1-166684 | * | 6/1989 |
| JP | 2-76493 | * | 3/1990 |
| JP | 2537242 | * | 7/1996 |
| JP | 2537243 | * | 7/1996 |
| JP | 2537244 | * | 7/1996 |
| JP | 10-336666 | * | 12/1998 |
| JP | 2000-217116 | | 8/2000 |
| WO | 97/16031 | | 5/1997 |

* cited by examiner

Primary Examiner—Andy Rao
(74) Attorney, Agent, or Firm—Dickstein, Shapiro, Morin & Oshinsky, LLP

(57) ABSTRACT

A picture coding apparatus includes a motion vector detector, a vector code length optimizing section, a motion vector coding unit, a variable length coding section, and a multiplexing unit. The motion vector detector detects motion vectors between a current picture data and a reference picture data in units of macro blocks. The vector code length optimizing section determines one of a plurality of parameters based on a total quantity of vector codes for differential motion vectors obtained from the detected motion vectors. The vector code includes a vector variable length code and a vector fixed length code. The motion vector coding unit encodes each of the differential motion vectors into the vector code using the determined parameter. The variable length coding section encodes picture data difference into picture data variable length codes in units of macro blocks. The picture data difference indicates a difference between the current picture data and a data obtained by carrying out a motion compensation to the reference picture data based on the detected motion vectors. The multiplexing unit multiplexes the picture data variable length code and the fixed length code for every macro block.

15 Claims, 7 Drawing Sheets

REFERENCE FRAME

PREDICTED FRAME 1 (DISTANCE 1)

PREDICTED FRAME 2 (DISTANCE 2)

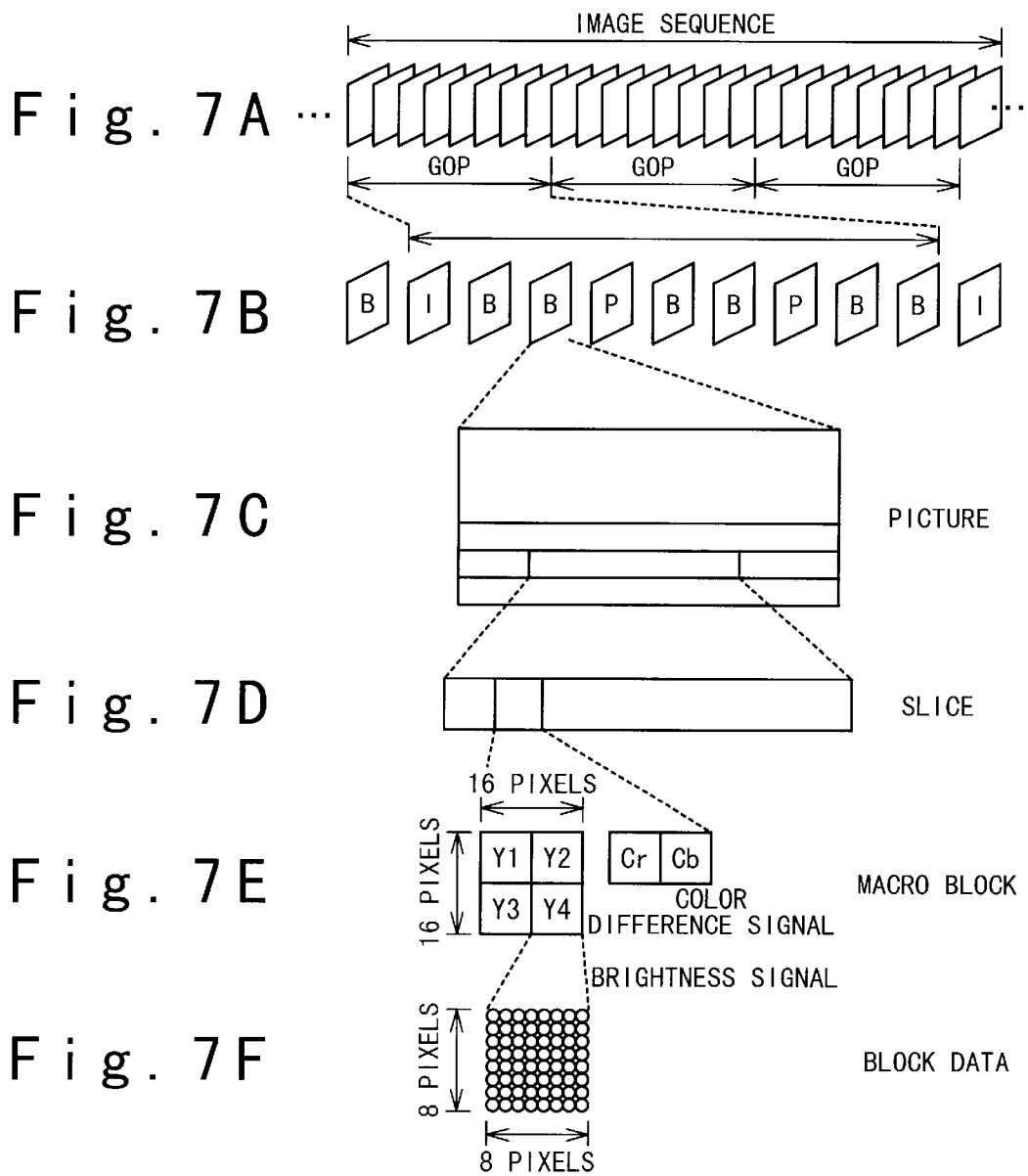

PICTURE CODING APPARATUS WITH CODING EFFICIENCY IMPROVED

BACKGROUND OF THE INVENTION

1. Field of the Invention

The present invention relates to a picture coding apparatus, and more particularly to a picture coding apparatus encoding a digital picture data.

2. Description of the Related Art

As the technique for encoding picture data in the high efficiency, a motion compensation interframe prediction coding system is conventionally standardized and widely used (for example, MPEG and so on). The system uses the property that the correlation between video signals of continuing frames is generally large. Only the differential signal between a current frame (hereinafter, to be referred to as a predicted frame) and the past or future frame (hereinafter, to be referred to as a reference frame) is coded to reduce temporal redundancy.

In such an motion compensation interframe prediction coding system, the previously coded reference frame is moved based on a motion vector and the moved reference frame is used for an prediction signal. Subsequently, the difference value (hereinafter, to be referred to as a motion vector) between the prediction signal and a signal for the current frame is encoded. Thus, the increase of the code amount caused by the change of picture data is restrained.

Here, a general image processing will be described using MPEG as an example.

FIGS. 7A to 7F are diagrams showing the image processing in the MPEG. As shown in FIG. 7A, the whole video program is referred as an image sequence and is composed of a plurality of GOPs (Group Of Pictures). The image sequence starts with a sequence header (not shown) and ends with a sequence end (not shown). Data of the whole image sequence such as a data indicative of the size of the picture, the number of frames to be coded for one second, and a communication rate are stored in the sequence header.

The GOP is composed of a GOP header (not shown) and a plurality of pictures following the GOP header. Each picture is either of an I picture, a P picture, and a B picture. The I picture is the picture which is coded using only the picture signal in the frame. The P picture is the picture which is predicted from the coded picture (I or P picture) immediately before the P picture and is used for the motion prediction only in the front direction in the image sequence. The B picture is the picture which is predicted from two neighbor coded pictures (I and/or P pictures) and is used for the motion prediction in the front and back directions. It should be noted that the B picture is not used for the prediction of another picture.

Also, each picture corresponds to each screen of a picture signal and is composed of a picture header (not shown) and a plurality of slices following the picture header. Each slice is composed of a plurality of macro blocks. The macro block is composed of pixel blocks of 16 pixels×16 pixels.

Next, a conventional motion compensation interframe prediction coding apparatus will be described. FIG. 1 is a block diagram showing a conventional motion compensation interframe prediction coding apparatus. As shown in FIG. 1, the conventional apparatus is composed of an input buffer 102 with an input terminal 101, a subtracting circuit 103, a motion vector detecting unit 104, a motion compensating unit 105, a DCT unit 106, a quantization unit 107, a variable length coding unit 108, an inverse quantization unit 109, an inverse DCT unit 110, an adding circuit 111, a frame memory 112, a vector coding unit 113, and a multiplexing unit 114.

An input picture data is supplied to and stored in the input buffer 102 via the input terminal 101. The input buffer 102 supplies the stored picture data to the subtracting circuit 103 and the motion vector detecting unit 104 in units of predetermined pixel blocks (i.e., in units of the above-mentioned macro blocks). The subtracting circuit 103 is supplied with the picture data outputted from the input buffer 102 and a block data (a reference macro block data) of a reference frame which is subjected to the motion compensation by the motion compensating unit 105. The subtracting circuit 103 determines an interframe differential signal using them and supplies to the DCT unit 106.

After the DCT unit 106 carries out a DCT (discrete cosine transformation) process to the supplied interframe differential signal to separate the frequency components in the horizontal and vertical directions, and to output the separated components to the quantization unit 107. The quantization unit 107 quantizes the output of the DCT unit 106 to reduce a bit rate and supplies the quantized data to the variable length coding unit 108 and the inverse quantization unit 109. The inverse quantization unit 109 inversely quantizes the output of the quantization unit 107 and then supplies to the inverse DCT unit 110.

The inverse DCT circuit 110 carries out an inverse DCT process to the output of the inverse quantization unit 109 and then supplies to the adding circuit 111. That is, a decoding process is carried out by the inverse quantization unit 109 and the inverse DCT unit 110, and a data similar to the interframe differential signal before the coding is obtained. The adding circuit 111 is supplied with the block data of the reference frame which is subjected to the motion compensation by the motion compensating unit 105 and the output of the inverse DCT unit 110. The adding circuit 111 adds them to reproduce the predicted block data of a current frame. The predicted block data is supplied to the frame memory 112.

The frame memory 112 stores the supplied block data and then supplies to the motion compensating unit 105 and the motion vector detecting unit 104 as the data of a new reference frame. The motion vector detecting unit 104 is supplied with the block data of the current frame from the input buffer 102, and the block data of the reference frame from the frame memory 112. The motion vector detecting unit 104 detects the motion vector between the reference frame and the current frame using the block data supplied thereto and supplies the detected motion vector to the motion compensating unit 105.

The block data of the reference frame is supplied from the frame memory 112 to the motion compensating circuit 105. Therefore, the motion compensating circuit 105 carries out motion compensation to the block data of the reference frame based on the motion vector from the motion vector detecting circuit 104. The motion compensating circuit 105 produces and supplies the block data of the reference frame subjected to the motion compensation (the reference macro block data) to the subtracting circuit 103.

On the other hand, the variable length coding unit 108 encodes the output of the quantization unit 107 into a variable length code and supplies the variable length code to the multiplexing unit 114. The vector coding unit 113 encodes the motion vector detected by the motion vector detecting unit 104 into a variable length code to supply to the multiplexing unit 114. The multiplexing unit 114 multiplexes the motion vector value encoded in the variable length code by the vector coding unit 113 as a header data and the picture data encoded in the variable length code by the variable length coding unit 108 and output the multiplexed code.

Next, the operation principle of such an motion compensation interframe prediction coding apparatus will be described.

FIGS. 2A to 2C are diagrams showing a reference frame and a predicted frames when an object moves to a direction at a constant speed. Generally, the movement of the object in the picture is felt as if it is very complicated as movement of a person in a TV picture. However, when the change of the picture is considered in units of pixels, it is not always correct. Because the motion compensation is carried out in units of predetermined pixel blocks, most of the pixels changes almost at the constant speed in compression of a picture, as shown in FIGS. 2B and 2C. Therefore, it could be considered that the motion vector becomes large in proportional to the distance from the reference frame. Thus, it would be valid that a motion vector search region is determined in accordance with the distance between the predicted frame and the reference frame in the motion compensation interframe prediction coding apparatus.

For example, it is supposed that the search region of the motion vector (x1,y1) of a predicted frame 1 is:

$$-r < x1 < r \text{ and } -r < y1 < r$$

where r is an optional natural number. In this case, the motion vector search region of a predicted frame 2 is at least:

$$-2r < x2 < 2r \text{ and } -2r < y2 < 2r$$

As an example of the motion compensation interframe prediction coding apparatus in which a search region is expanded in accordance with the distance between the reference frame and the predicted frame, there are known the apparatuses disclosed in Japanese Laid Open Patent Application (JP-A-Heisei 1-166684) and Japanese Laid Open Patent Application (JP-A-Heisei 10-336666).

In these conventional apparatuses, a search region is not simply made wide in accordance with the distance between the reference frame and the predicted frame, but the search region is appropriately adjusted. That is, an offset is set to the center position of the search region of the previously set motion vector in accordance with the values of the motion vectors in the past coded frames. Thus, the search region is shifted without changing the size of the search region, to apparently expand the motion vector search region.

However, when Huffman coding is carried out to allocate a variable length code to each of the motion vectors, a huge table is necessary because the motion vector has a wide dynamic range. As mentioned above, it is considered that the value of the motion vector is proportional to the distance between the predicted frame and the reference frame. Therefore, it would be efficient if the motion vector is divided into a first portion which does not depend on the distance between the frames, and a second portion which depends on the distance between the frames. A variable length code is allocated to the first portion and another coding method is applied to the second portion.

In the MPEG system defined in the international standard for the picture coding, a variable length code is allocated to a value in a range of "−16 to +16" as "motion_code" for the coding which does not depend on the frame interval. Also, a parameter called "f_code" is used for the coding which depends on the frame interval.

The following table 1 shows the correspondence of the value of motion_code and the variable length code. The number of bits in the variable length code is decreased as the value approaches "0" and increased as the value layers from "0" as shown in the table 1.

TABLE 1

| Variable Length Code | motion_code |
| --- | --- |
| 00000011001 | −16 |
| 00000011011 | −15 |
| 00000011101 | −14 |
| 00000011111 | −13 |
| 00000100001 | −12 |
| 00000100011 | −11 |
| 0000010011 | −10 |
| 0000010101 | −9 |
| 0000010111 | −8 |
| 00000111 | −7 |
| 00001001 | −6 |
| 00001011 | −5 |
| 0000111 | −4 |
| 00011 | −3 |
| 0011 | −2 |
| 011 | −1 |
| 1 | 0 |
| 010 | 1 |
| 0010 | 2 |
| 00010 | 3 |
| 0000110 | 4 |
| 00001010 | 5 |
| 00001000 | 6 |
| 00000110 | 7 |
| 0000010110 | 8 |
| 0000010100 | 9 |
| 0000010010 | 10 |
| 00000100010 | 11 |
| 00000100000 | 12 |
| 00000011110 | 13 |
| 00000011100 | 14 |
| 00000011010 | 15 |
| 00000011000 | 16 |

The following table 2 shows a relation between f_code and the motion vector search region, the search region is expanded in proportional to square of 2, each time the value of f_code increases, as shown in this table.

TABLE 2

| f_code | search region (integer multiplied) |
| --- | --- |
| 1 | −16 to +15 |
| 2 | −32 to +31 |
| 3 | −64 to +63 |
| 4 | −128 to +127 |
| . | . |
| . | . |
| . | . |

On the other hand, the MPEG system adopts a differential encoding system to encode a difference (hereinafter, referred to as a differential motion vector) between a current motion vector and a previous motion vector which are for the macro blocks adjacent to each other in the same frame. Generally, the values of the neighbor motion vectors are similar. Therefore, the value of the differential motion vector nearer to "0" is frequently generated. Therefore, the coding efficiency can be improved when a short code is allocated to the differential motion vector value nearer to "0", as shown in the table 1. When the range of the differential motion vector value is "−16 to +15", the differential motion vector value should be coded using the table 1, just as it is.

However, when the differential motion vector value is in range of "−32 to +31", the differential motion vector value can not be expressed using only the table 1. Therefore, a fixed length code is added to the variable length code shown in the table 1, so that the differential motion vector value can be expressed. That is, the following table 3 is referred to to determine the value of the fixed length code and the value of motion_code for the differential motion vector value. A variable length code corresponding to the determined motion_code is retrieved from the table 1 and the above-mentioned fixed length code is added after the selected variable length code.

TABLE 3

In case of f_code = 2

| motion_code | fixed length code | |
|---|---|---|
| | 0 | 1 |
| −16 | −31 | −32 |
| −15 | −29 | −30 |
| . | . | . |
| . | . | . |
| . | . | . |
| −2 | −3 | −4 |
| −1 | −1 | −2 |
| 0 | 0 | |
| 1 | 1 | 2 |
| 2 | 3 | 4 |
| . | . | . |
| . | . | . |
| . | . | . |
| +15 | 29 | 30 |
| +16 | 31 | |

For example, it is supposed that the differential motion vector value is "4". In this case, as seen from the table 3, the fixed length code is "1" and the motion_code is "2". Therefore, if being referred to the table 1, the variable length code for motion_code of "2" is "0010". Thus, the code "00101" is determined by adding the above-mentioned fixed length code of "1" to "0010".

It should be noted that the above process can be applied in the similar manner, when the differential motion vector value is in a range of "−64 to +63". After a 2-bit fixed length code and a motion_code are determined by referring to the following table 4, a variable length code corresponding to the determined motion_code is determined by referring to the table 1, and then the fixed length code is added to the selected variable length code.

TABLE 4

In case of f_code = 3

| motion_code | fixed length code | | | |
|---|---|---|---|---|
| | 00 | 01 | 10 | 11 |
| −16 | −61 | −62 | −63 | −64 |
| −15 | −57 | −58 | −59 | −60 |
| . | | . | | |
| . | | . | | |
| . | | . | | |
| −2 | −5 | −6 | −7 | −8 |
| −1 | −1 | −2 | −3 | −4 |
| 0 | 0 | | | |
| 1 | 1 | 2 | 3 | 4 |
| 2 | 5 | 6 | 7 | 8 |
| . | | . | | |
| . | | . | | |
| . | | . | | |

TABLE 4-continued

In case of f_code = 3

| motion_code | fixed length code | | | |
|---|---|---|---|---|
| | 00 | 01 | 10 | 11 |
| +15 | 57 | 58 | 59 | 60 |
| +16 | 61 | 62 | 63 | |

In this way, in the MPEG system, the value of f_code is increased in accordance with the distance between the reference frame and the predicted frame so that the motion vector search region can be expanded proportionally.

However, in such a conventional method to determine the value of f_code in accordance with the frame distance between the reference frame and the predicted frame, it is not always possible to efficiently encode the motion vector in all types of pictures.

For example, when the differential motion vector value of "1" is coded, the code has the length of 3 bits ("010") if f_code=1, whereas the code has the length of 4 bit ("0100") if f_code=2. Also, when the differential motion vector value of "4" is coded, the code has the length of 7 bits ("0000110") if f_code=1, whereas the code has the length of only 5 bits ("00101"), if f_code=2. That is, the coding using f_code=1 is efficient, if the differential motion vector value falls within a range shown for f_code=1 and the generation distribution of differential motion vector values is centered in the neighborhood of "±1", as the result of the motion vector detection in the frame allocated to f_code=2. On the other hand, the generation distribution of differential motion vector values is centered in the neighborhood of "±4", the differential motion vector value can be efficiently coded when f_code=2 is used.

When the coding efficiency of the motion vector value is low, the quantity of codes allocated to the picture data is decreased so that the picture quality is degraded. Therefore, how to determine f_code is important. In this way, when f_code is simply determined in accordance with the distance of the reference frame and the predicted frame, the coding efficiency of the motion vector value is degraded. As a result, the quantity of codes allocated to the picture data is decreased and the picture quality is degraded.

In conjunction with the above description, a coding system of a motion-compensated motion vector is disclosed in Japanese Patent No. 2,537,242. In this reference, a memory (1) stores a predetermined number of input motion vectors. A code book (2) stores a plurality of previously determined motion vector patterns. A matching determination circuit (3) compares the input motion vector and the motion vector pattern to select the motion vector pattern having the smallest error, and to send the index to an entropy encoder (10). Thus, the coding system of the motion-compensated motion vector encodes the input motion vector into a variable length code by the entropy encoder (10).

Also, o a coding system of a motion-compensated motion vector is disclosed in Japanese Patent No. 2,537,243. In this reference, a memory (1) stores a predetermined number of input motion vectors. A code book (2) stores a plurality of previously determined prediction error vector patterns. A predicting circuit (3) generates a predicted motion vector. A prediction error generating circuit (4) generates a set of prediction error vectors from the input motion vector and the predicted motion vector. A matching determination circuit (5) compares the set of prediction error vectors and the prediction error vector patterns to select one prediction error vector pattern having the smallest error, and to send its index to an entropy encoder (10). In this case, the predicting circuit (3) generates the predicted motion vector from a prediction error pattern obtained by multiplexing the indexes outputted from the matching determination circuit (5) and a previous predicted motion vector by a multiplexing circuit (6).

Also, a coding system of a motion-compensated motion vector is disclosed in Japanese Patent No. 2,537,244. In this reference, a code book (1) stores a plurality of prediction error patterns each of which is composed of a prediction error motion vector corresponding to a predetermined number of input screen blocks. A predicting circuit (2) generates a predicted motion vector pattern corresponding to the input screen block and stores the prediction error pattern corresponding to the predicted motion vector pattern in the form of index. A matching determination circuit (3) input the predicted motion vector pattern, compensates a previous screen described in a frame memory (12) to compare with the input screen, selects the predicted motion vector pattern with the smallest error, and sends the index of the prediction error pattern corresponding to the predicted motion vector pattern to a receiving side via an entropy encoder (10). The predicting circuit (2) generates the predicted motion vector pattern from a previous predicted vector pattern and the prediction error pattern obtained by decoding the index outputted from the matching determination circuit (3) by a decoder (4).

Also, an image coding apparatus is disclosed in Japanese Laid Open Patent Application (JP-A-Heisei 2-076493). In this reference, a motion vector of an inputted image are detected for every small block. A motion vector field for the whole image is calculated from the detected motion vectors. The motion vector for every small block is developed by use of the motion vector field. The developed motion vector is used for motion compensation interframe prediction, and the motion vector field is transmitted as a motion vector data.

Also, a coding system of a motion-compensated motion vector is disclosed in Japanese Laid Open Patent Application (JP-A-Showa 64-73986). In this reference, a code bock (1) stores a plurality of motion vector patterns composed of motion vectors for a predetermined number of input screen blocks. A matching determination circuit (2) compares a screen obtained by motion compensating a previous screen stored in a frame memory (12) in accordance with the motion vector pattern and an input screen, and selects one of the plurality of motion vector patterns which has the smallest error, and sends an index of the selected motion vector pattern to an entropy encoder (10).

SUMMARY OF THE INVENTION

Therefore, an object of the present invention is to provide a picture coding apparatus in which the coding quality of a picture can be improved.

Another object of the present invention is to provide a picture coding apparatus in which the coding efficiency of a picture can be increased.

Still another object of the present invention is to provide a picture coding apparatus in which a type of f_code is adaptively determined so that the coding efficiency of a picture can be increased.

Yet still another object of the present invention is to provide a picture coding apparatus in which a table is used so that a type of f_code is adaptively determined with short processing time.

In order to achieve an aspect of the present invention, a picture coding apparatus includes a motion vector detector, a vector code length optimizing section, a motion vector coding unit, a variable length coding section, and a multiplexing unit. The motion vector detector detects motion vectors between a current picture data and a reference picture data in units of macro blocks. The vector code length optimizing section determines one of a plurality of parameters based on a total quantity of vector codes for differential motion vectors obtained from the detected motion vectors. The vector code includes a vector variable length code and a vector fixed length code. The motion vector coding unit encodes each of the differential motion vectors into the vector code using the determined parameter. The variable length coding section encodes picture data difference into picture data variable length codes in units of macro blocks. The picture data difference indicates a difference between the current picture data and a data obtained by carrying out a motion compensation to the reference picture data based on the detected motion vectors. The multiplexing unit multiplexes the picture data variable length code and the fixed length code for every macro block. In this case, the vector variable length code is a value of motion_code in an MPEG system, and the vector fixed length code is a value of f_code in the MPEG system, and the determined parameter is a type of f_code.

The vector code length optimizing section determines parameter candidates from among the plurality of parameters based on the detected motion vectors, calculates the total quantity of vector codes for the differential motion vectors when each of the parameter candidates is used, and determines the parameter from among the parameter candidates based on the calculated total quantities of vector codes.

Also, the vector code length optimizing section may include a parameter table indicating a relation of a set of average of the differential motion vectors and a deviation of the differential motion vectors and the parameters. At this time, the vector code length optimizing section determines the average of the differential motion vectors, determines the deviation of the differential motion vectors, and refers to the parameter table based on the determined average and the determined deviation to determines the parameter.

Also, the vector code length optimizing section may include a parameter table indicating a relation of a set of average of the differential motion vectors and a distribution region of the differential motion vectors and the parameters. At this time, the vector code length optimizing section determines the distribution region of the differential motion vectors, determines the average of the differential motion vectors, and refers to the parameter table based on the determined average and the determined distribution region to determines the parameter.

In order to achieve another aspect of the present invention, a method of encoding a picture data in an MPEG system, is attained by detecting motion vectors between a current picture data and a reference picture data in units of macro blocks; by determining a specific one of a plurality of parameters based on a total quantity of vector codes for differential motion vectors obtained from the detected motion vectors, the vector code including a vector variable length code and a vector fixed length code; by encoding each of the differential motion vectors into the vector code using the determined specific parameter; by encoding picture data difference into picture data variable length codes in units of macro blocks, the picture data difference indicating a difference between the current picture data and a data obtained by carrying out a motion compensation to the reference picture data based on the detected motion vectors; and by multiplexing the picture data variable length code and the fixed length code for every macro block.

The vector variable length code is a value of motion_code, and the vector fixed length code is a value of f_code, and the determined specific parameter is a type of f_code.

The determining the specific parameter may include: determining parameter candidates from among the plurality of parameters based on the detected motion vectors; calculating the total quantity of vector codes for the differential motion vectors when each of the parameter candidates is used, and determining the specific parameter from among the parameter candidates based on the calculated total quantities of vector codes.

Also, the determining the specific parameter may include: determining the average of the differential motion vectors, determining the deviation of the differential motion vectors, and referring to a parameter table based on the determined average and the determined deviation to determines the specific parameter. Here, the parameter table indicates a relation of a set of average of the differential motion vectors and a deviation of the differential motion vectors and the parameters.

Also, the determining the specific parameter may include: determining the distribution region of the differential motion vectors; determining the average of the differential motion vectors; and by referring to a parameter table based on the determined average and the determined distribution region to determines the specific parameter, the parameter table indicating a relation of a set of average of the differential motion vectors and a distribution region of the differential motion vectors and the parameters.

In order to achieve still another aspect of the present invention, a recording medium in which a program is stored for a method of encoding differential motion vectors obtained from motion vectors. The method is accomplished by detecting motion vectors between a current picture data and a reference picture data in units of macro blocks; by determining a specific one of a plurality of parameters based on a total quantity of vector codes for differential motion vectors the vector code including a vector variable length code and a vector fixed length code; and by encoding each of the differential motion vectors into the vector code using the determined specific parameter.

BRIEF DESCRIPTION OF THE DRAWINGS

FIGS. 7A to 7F are diagrams showing compression of a picture.

DESCRIPTION OF THE PREFERRED EMBODIMENTS

Next, a picture coding apparatus of the present invention will be described with reference to the attached drawings.

Figure 1:
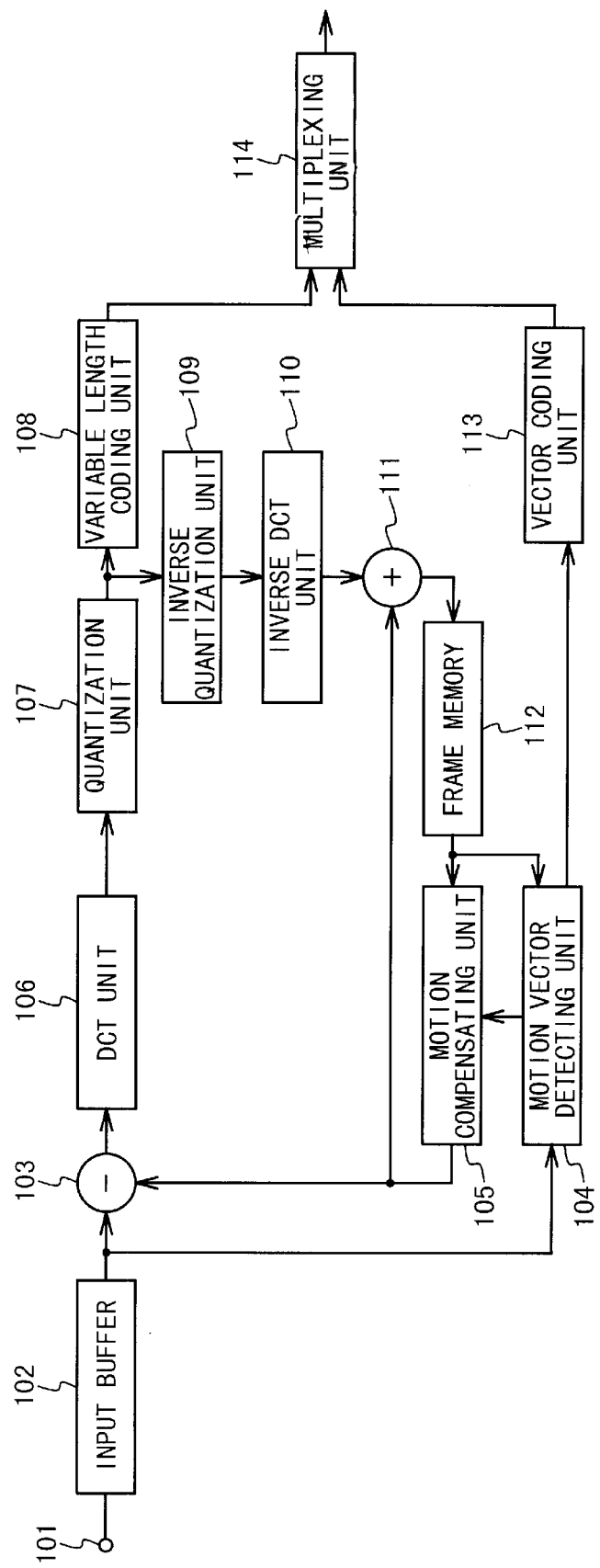
FIG. 1 is a block diagram showing a conventional picture coding apparatus.
Figure 2A:
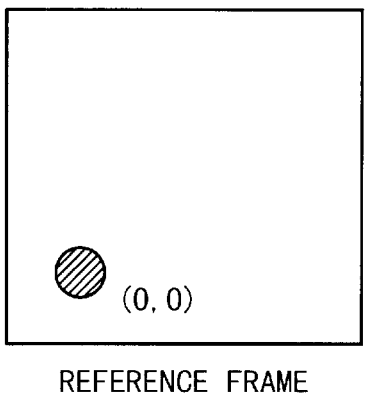
FIGS. 2A to 2C are diagrams showing relations of a reference frame and predicted frames.
Figure 2B:
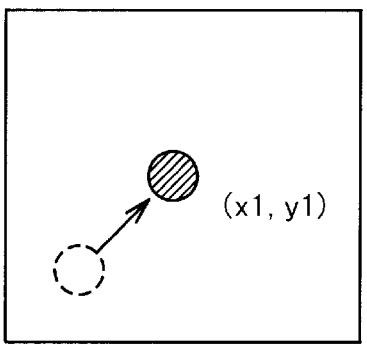
Figure 2C:
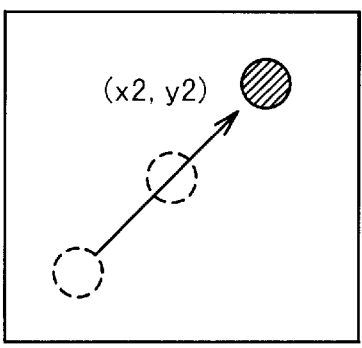
Figure 3:
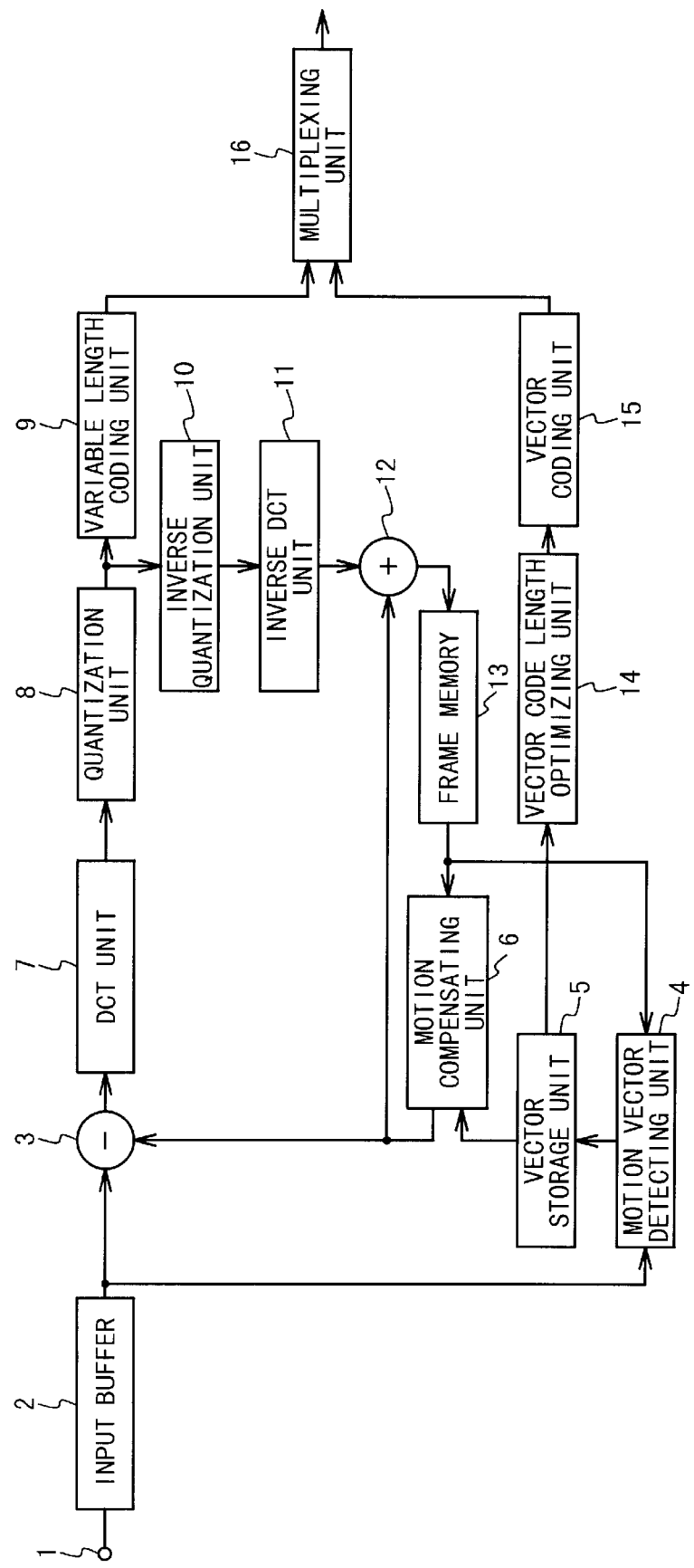
FIG. 3 is a block diagram showing the structure of a picture coding apparatus according to a first embodiment of the present invention.

FIG. 3 is a block diagram showing the structure of the embodiment of the present invention. As shown in FIG. 3, the picture coding apparatus in the first embodiment is composed of an input buffer 2 with an input terminal 1, a motion vector detecting unit 4, a vector storage unit 5, a motion compensating unit 6, a subtracting unit 3, a DCT unit 7, a quantization unit 8, a variable length coding unit 9, an inverse quantization unit 10, an inverse DCT unit 11, an adding circuit 12, a frame memory 13, a vector code length adapting unit 14, a vector coding unit 15, and a multiplexing unit 16.

An input picture data is supplied to and stored in the input buffer 2 via the input terminal 1. The input buffer 2 supplies the stored picture data to the subtracting unit 3 and the motion vector detecting unit 4 in units of predetermined pixel blocks (i.e., in units of macro blocks). The subtracting unit 3 is supplied with the picture data outputted from the input buffer 2 and the block data (the reference macro block data) of the reference frame which is subjected to the motion compensation by the motion compensating unit 6. The subtracting unit 3 determines an interframe differential signal from them to supply to the DCT unit 7.

The motion vector detecting unit 4 is supplied with the block data of the current frame from the input buffer 2 and the a block data of a reference frame from the frame memory 13. The motion vector detecting unit 4 detects a motion vector between the current frame and the reference frame using the block data supplied thereto, and stores the detected motion vector in the vector storage unit 5.

The vector storage unit 5 has a storage capacity enough to store motion vectors for all macro blocks in a single frame. The motion compensating unit 6 reads out the reference frame from the frame memory 13 and reads out the motion vector for the macro block to be coded from the vector storage unit 5. Then, the motion compensating unit 6 produces the reference macro block data which is subjected to the motion compensation, to supply to the subtracting unit 3.

After the DCT unit 7 carries out a DCT (discrete cosine transformation) process to the interframe differential signal supplied from the subtracting unit 3 to separate the frequency components in the horizontal and vertical directions and then to supply to the quantization unit 8. The quantization unit 8 quantizes the output of the DCT unit 7 to reduce a bit rate. Then, the quantization unit 8 supplies the quantized data to the variable length coding unit 9 and the inverse quantization unit 10. The inverse quantization unit 10 inversely quantizes the output of the quantization unit 8 and then supplies to the inverse DCT unit 11. The inverse DCT unit 11 carries out a inverse process of the DCT process to the output of the inverse quantization unit 10, and then supplies to the adding unit 12. That is, a decoding process is carried out by the inverse quantization unit 10 and the inverse DCT unit 11, and a data similar to the interframe differential signal before the coding is obtained.

The adding unit 12 is supplied with the reference macro block data which is subjected to the motion compensation by the motion compensating unit 6 and the output of the inverse DCT unit 11. The adding unit 12 adds them to reproduce the predicted block data of a current frame. The predicted block data is supplied to and stored in the frame memory 13. The frame memory 13 supplies the block data to the motion compensating unit 6 and the motion vector detecting unit 4 as the data of a new reference frame.

A vector code length optimizing unit 14 carries out an optimizing process such that the motion vectors stored in the vector storage unit 5 are encoded into codes having a code length as short as possible. The detail of the optimizing process will be described later. The vector coding unit 15 encodes the motion vectors into vector codes using the value of f_code which is optimized by the vector code length optimizing unit 14. The vector coding unit 15 supplies the vector codes to the multiplexing section 16.

On the other hand, the variable length coding unit 9 encodes the output of the quantization unit 8 into picture data variable length codes in units of macro blocks and supplies to the multiplexing section 16. The multiplexing unit 16 multiplexes the vector code from the vector coding unit 15 as a header data and the picture data variable length code from the variable length coding unit 9 in units of macro blocks. Then, the multiplexing unit 16 outputs the multiplexed result.

Next, the operation of the picture coding apparatus in the first embodiment will be de scribed.

The motion vector detecting unit 4 searches a predetermined search region in the reference frame which is supplied from the frame memory 13 with respect to the macro block data supplied to from the input buffer 2 and determines the motion vector. Before the coding process by the subtracting unit 3 and the subsequent units is executed, motion vectors in all the macro blocks from the macro block MB0 in the upper left of the current frame to the macro block MBN in the lower right as shown in the following table 5 are determined and stored in the vector storage unit 5.

TABLE 5

| $MB_0$ | $MB_1$ | $MB_2$ | $MB_3$ | | |
|---|---|---|---|---|---|
| | | | | $MB_{N-1}$ | $MB_N$ |

Figure 4:
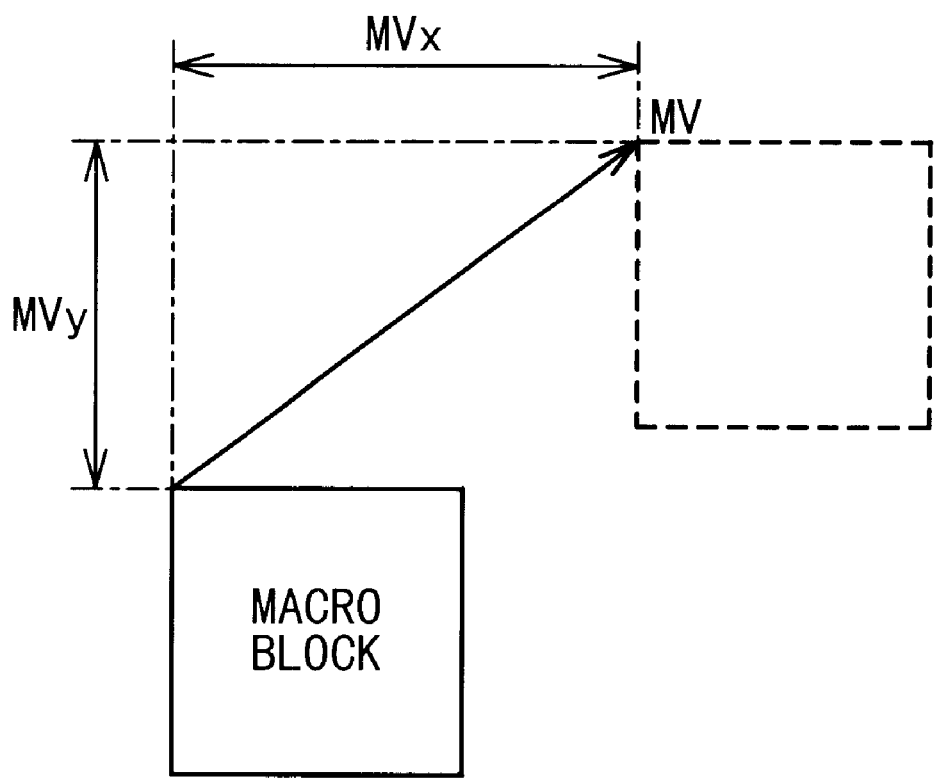
FIG. 4 is a diagram showing a macro block.

The vector storage unit 5 stores the values of the motion vectors which are detected by the motion vector detecting unit 4 in order from the macro block MB0 to the macro block MBN. Here, the motion vector MV has a horizontal component (MVx) and a vertical component (MVy) as shown in FIG. 4. In the MPEG system as the international standard of the picture coding, there are carried out an interpolating prediction using both of the forward prediction from a past frame and the backward prediction from a future frame. The field prediction is carried out for each of even fields and odd fields. Therefore, there are four vectors per one macro block in the maximum, i.e., eight components exist in the maximum. Thus, the vector storage unit 5 has the memory capacity such that the components of (the macro block count in one frame)*8 can be stored at least.

In the MPEG system, the method is adopted in which the differential signal between the motion vector in the macro block of the current frame and the motion vector in the macro block immediately previous macro block is encoded. Also, the method is adopted in which the differential signal is encoded using a variable length code of motion_code shown in the table 1, the table 3, and the table 4, and a parameter of f_code shown in the table 2. Therefore, the vector code length optimizing unit 14 calculates differential motion vectors for the macro blocks of one frame from the motion vectors which are stored in the vector storage unit 5. The vector code length optimizing unit 14 selects f_code such that a vector code quantity for the frame becomes the least from the values of these differential motion vectors.

Figure 5:
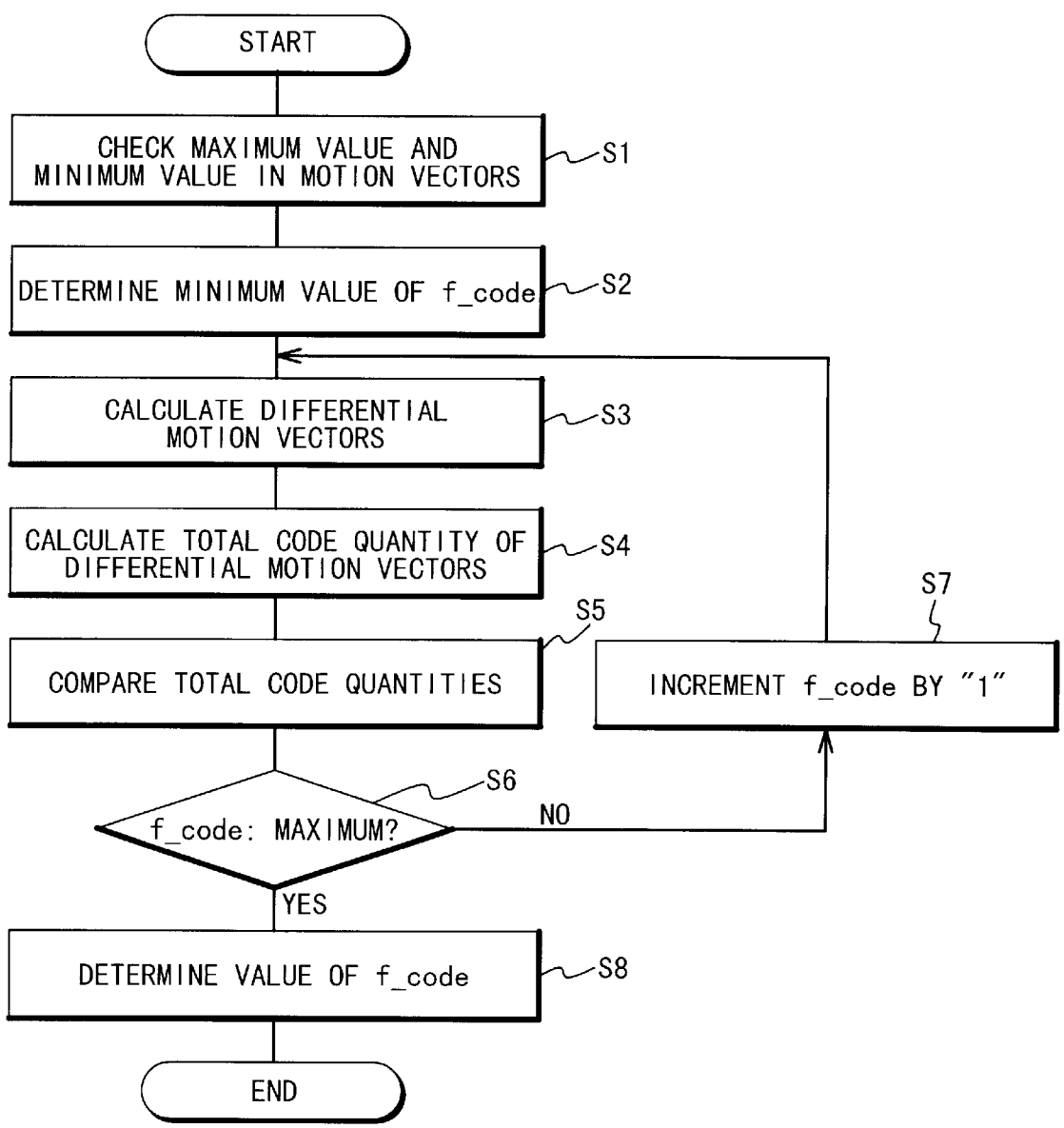
FIG. 5 is a flow chart showing the operation of the picture coding apparatus according to the first embodiment of the present invention.

FIG. 5 is a flow chart showing the operation of the vector code length optimizing unit in the first embodiment.

First, a maximum value and a minimum value are determined from the components of all the motion vectors for one frame stored in the vector storage unit 5 (Step S1). As a result of the above determination, if the motion vector values are in a range of "−16 to +15", motion_code shown in table 1 is allocated just as it is. Thus, the minimum f_code is "1". Also, if the motion vector values are in the range of "−32 to +31", a fixed length code of 1 bit becomes necessary as shown in the table 3 and the minimum f_code is "2" Step S2).

Next, using the minimum value of f_code which has been acquired at the step S2, the differential motion vectors between the macro blocks are calculated (Step S3). It should be noted that the change range of the differential motion vector becomes twice the change range of the original motion vector. Therefore, the differential motion vector is fit into the change range of the original motion vector by carrying out a modulo correction to the differential motion vector.

Next, the differential motion vectors obtained at the step S3 are encoded and a total code quantity of the differential motion vectors for one frame is calculated (Step S4). When the total code quantity of the differential motion vectors is already calculated using another f_code, the total code quantity which has been calculated this time and the already calculated total code quantity are compared, and f_code is determined such that the total code quantity becomes small (Step S5).

Next, the value of f_code is incremented by "1" at the step S6 until f_code is set to the maximum value which has been determined at the step S1 (step S7). Then, the flow returns to the step S3. Therefore, every time the value of f_code is increased, the total code quantity of the differential motion vectors is repeatedly calculated. Finally, f_code is determined to have the least total code quantity at a step S8.

It should be noted that the minimum f_code is "1", if the original motion vector is in the range of "−16 to +15". However, when the differential motion vector is "4", the code quantity of 7 bits is needed when the coding is carried out in f_code=1 from the tables 1 and 3, just as it is. On the other hand, when the coding is carried out in f_code=2 or f_code=3, the code quantity of 5 bits is only needed. Therefore, when the generation distribution of the differential motion vectors centers in neighborhood of "4", the total code quantity becomes less when the coding is carried out in f_code=2 or f_code=3.

In the same way, when the differential motion vector is "1", the code quantity of 3 bits is only needed when the coding is carried out in f_code=1. However, the code quantity of 4 bits becomes necessary when the coding is carried out in f_code=2. Therefore, if the generation distribution of the differential motion vectors centers in the neighborhood of "1", the total code quantity becomes less when the coding is carried out in f_code=1.

The vector coding unit 15 encodes a differential motion vector into a vector code for every macro block using the value of f_code which has been determined by the vector code length optimizing unit 14. Then, the vector coding unit 15 outputs the vector code to the multiplexing section 16. Then, the multiplexing section 16 multiplexes the vector code from the vector coding unit 15 as the header data and the picture data variable length code from the variable length coding unit 9 for every macro block and outputs it.

Next, the picture coding apparatus according to the second embodiment of the present invention will be described.

As described above, the total code quantity of the differential motion vectors is calculated for every value of f_code, and the optimal value of f_code may be selected such that the total code quantity becomes the smallest. In this method, however, the coding sometimes takes time too much. Therefore, another method may be used in which a correspondence table (not shown) indicating a relation of a set of an average of differential motion vector and f_code and a type of f_code is previously provided in the vector code length optimizing unit 14.

Figure 6:
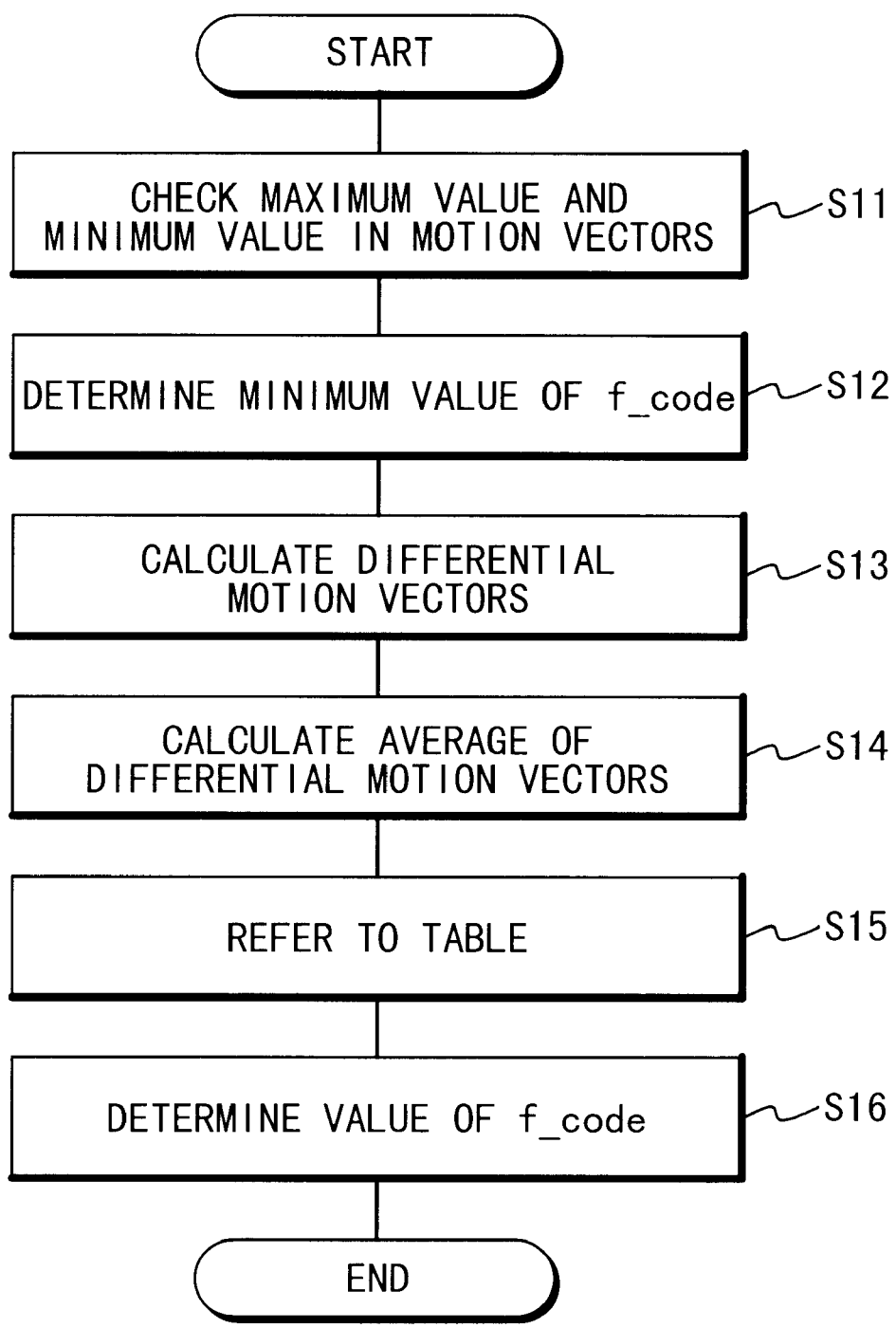
FIG. 6 is a flow chart showing the operation of the picture coding apparatus according to a second embodiment of the present invention.

FIG. 6 is a flow chart showing the operation of the picture coding apparatus in the second embodiment of the present invention.

First, a maximum value and a minimum value are determined as to components of all the motion vector for one frame which are stored in the vector storage unit 5 (Step S11).

As a result of this determination, if the differential motion vector values are in the range of "−16 to +15", motion_code shown in the table 1 is allocated just as it is. In this case, the minimum value of f_code is "1". Also, if the differential motion vector values are in the range of "−32 to +31", the fixed length code of 1 bit becomes necessary as shown in the table 3. In this case, the minimum f_code value becomes "2". Thus, the minimum f_code is determined (Step S12).

Next, using the minimum value of f_code which has been acquired at the step S12, the differential motion vectors between the macro blocks are calculated (Step S13).

Next, the average of the differential motion vectors which have been calculated at the step S13 is calculated (Step S14). Here, it is supposed that the correspondence table to a set of the average of the differential motion vectors and the determined minimum f_code is previously provided, as shown in the following table 6. The first candidate of f_code is used when the determined minimum f_code is "1". The second candidate of f_code is used when the determined minimum f_code is "2". Although not shown in the table 6, the values of f_code for the third candidate, the fourth candidate, . . . may be set in the table 6.

Next, at a step S15, the table 6 is referred to based on the range of the motion vector calculated at the step S11 and the average of the differential motion vectors calculated at the step S14, so that the type of f_code is determined (Step S16). Here, the range of the motion vector calculated at the step S11 corresponds to the minimum f_code.

As described above, in the second embodiment, it is not necessary to calculate the total code quantity of differential motion vectors for one frame. The table 6 is referred to based on the average of the differential motion vectors and the minimum f_code to determine the optimal type of f_code. Therefore, there is an effect that it is possible to carry out the processing of the vector code length optimizing unit at high speed.

TABLE 6

| average differential motion vector | 1st candidate of f_code | 2nd candidate of f_code |
| --- | --- | --- |
| . | | |
| . | | |
| . | | |
| −4 | 2 | 3 |
| −3 | 1 | 2 |
| −2 | 1 | 2 |
| −1 | 1 | 2 |
| 0 | 1 | 2 |
| 1 | 1 | 2 |
| 2 | 1 | 2 |
| 3 | 1 | 2 |
| 4 | 2 | 3 |
| . | | |
| . | | |
| . | | |

It should be noted that the correspondence table is provided as to the set of the average of differential motion vectors and the minimum f_code in the above embodiment. However, in place of the minimum f_code, an deviation may be calculated in the step S12 and be used.

As described above, according to the present invention, the coding quality of a picture can be increased. Especially, when a motion vector is encoded, the value of f_code is not allocated fixedly in accordance with the distance between the current frame and the reference frame. The value of f_code is allocated such that the code quantity of the motion vector become the least. As a result, the generation of the redundant code quantity of the motion vector can be prevented, compared with the case to fixedly allocate the value of f_code.

Also, the code quantity can be efficiently allocated to the picture code.

What is claimed is:

1. A picture coding apparatus comprising:

a motion vector detector detecting motion vectors between a current picture data and a reference picture data in units of macro blocks;

a vector code length optimizing section determining one of a plurality of parameters based on a total quantity of vector codes for differential motion vectors obtained from said detected motion vectors, said vector code including a vector variable length code and a vector fixed length code;

a motion vector coding unit encoding each of said differential motion vectors into said vector code using said determined parameter;

a variable length coding section encoding picture data difference into picture data variable length codes in units of macro blocks, said picture data difference indicating a difference between said current picture data and a data obtained by carrying out a motion compensation to said reference picture data based on said detected motion vectors; and a multiplexing unit multiplexing said picture data variable length code and said fixed length code for every macro block.

2. A picture coding apparatus according to claim 1, wherein said vector variable length code is a value of motion_code in an MPEG system, and said vector fixed length code is a value of f_code in said MPEG system, and said determined parameter is a type of f_code.

3. A picture coding apparatus according to claim 1, wherein said vector code length optimizing section:

determines parameter candidates from among said plurality of parameters based on said detected motion vectors, calculates said total quantity of vector codes for said differential motion vectors when each of said parameter candidates is used, and determines said parameter from among said parameter candidates based on said calculated total quantities of vector codes.

4. A picture coding apparatus according to claim 1, wherein said vector code length optimizing section includes a parameter table indicating a relation of a set of average of said differential motion vectors and a deviation of said differential motion vectors and said parameters, and wherein said vector code length optimizing section:
determines said average of said differential motion vectors,
determines said deviation of said differential motion vectors, and
refers to said parameter table based on said determined average and said determined deviation to determines said parameter.

5. A picture coding apparatus according to claim 1, wherein said vector code length optimizing section includes a parameter table indicating a relation of a set of average of said differential motion vectors and a distribution region of said differential motion vectors and said parameters, and wherein said vector code length optimizing section:
determines said distribution region of said differential motion vectors,
determines said average of said differential motion vectors, and
refers to said parameter table based on said determined average and said determined distribution region to determines said parameter.

6. A method of encoding a picture data in an MPEG system, comprising:
detecting motion vectors between a current picture data and a reference picture data in units of macro blocks;
determining a specific one of a plurality of parameters based on a total quantity of vector codes for differential motion vectors obtained from said detected motion vectors, said vector code including a vector variable length code and a vector fixed length code;
encoding each of said differential motion vectors into said vector code using said determined specific parameter;
encoding picture data difference into picture data variable length codes in units of macro blocks, said picture data difference indicating a difference between said current picture data and a data obtained by carrying out a motion compensation to said reference picture data based on said detected motion vectors; and
multiplexing said picture data variable length code and said fixed length code for every macro block.

7. A method according to claim 6, wherein said vector variable length code is a value of motion_code, and said vector fixed length code is a value of f_code, and said determined specific parameter is a type of f_code.

8. A method according to claim 6, wherein said determining said specific parameter includes:
determining parameter candidates from among said plurality of parameters based on said detected motion vectors,
calculating said total quantity of vector codes for said differential motion vectors when each of said parameter candidates is used, and
determining said specific parameter from among said parameter candidates based on said calculated total quantities of vector codes.

9. A method according to claim 6, wherein said determining said specific parameter includes:

determining said average of said differential motion vectors,
determining said deviation of said differential motion vectors, and
referring to a parameter table based on said determined average and said determined deviation to determines said specific parameter, said parameter table indicating a relation of a set of average of said differential motion vectors and a deviation of said differential motion vectors and said parameters.

10. A method according to claim 6, wherein said determining said specific parameter includes:
determining said distribution region of said differential motion vectors,
determining said average of said differential motion vectors, and
referring to a parameter table based on said determined average and said determined distribution region to determines said specific parameter, said parameter table indicating a relation of a set of average of said differential motion vectors and a distribution region of said differential motion vectors and said parameters.

11. A recording medium in which a program is stored for a method of encoding differential motion vectors obtained from motion vectors, wherein said method comprises:
detecting motion vectors between a current picture data and a reference picture data in units of macro blocks; and
determining a specific one of a plurality of parameters based on a total quantity of vector codes for differential motion vectors said vector code including a vector variable length code and a vector fixed length code; and
encoding each of said differential motion vectors into said vector code using said determined specific parameter.

12. A recording medium according to claim 11, wherein said vector variable length code is a value of motion_code, and said vector fixed length code is a value of f_code, and said determined specific parameter is a type of f_code.

13. A recording medium according to claim 11, wherein said determining said specific parameter includes:
determining parameter candidates from among said plurality of parameters based on said detected motion vectors,
calculating said total quantity of vector codes for said differential motion vectors when each of said parameter candidates is used, and
determining said specific parameter from among said parameter candidates based on said calculated total quantities of vector codes.

14. A recording medium according to claim 11, wherein said determining said specific parameter includes:
determining said average of said differential motion vectors,
determining said deviation of said differential motion vectors, and
referring to a parameter table based on said determined average and said determined deviation to determines said specific parameter, said parameter table indicating a relation of a set of average of said differential motion vectors and a deviation of said differential motion vectors and said parameters.

15. A recording medium according to claim 11, wherein said determining said specific parameter includes:
determining said distribution region of said differential motion vectors, determining said average of said differential motion vectors, and referring to a parameter table based on said determined average and said determined distribution region to determines said specific parameter, said parameter table indicating a relation of a set of average of said differential motion vectors and a distribution region of said differential motion vectors and said parameters.

* * * * *